US010923690B2

(12) United States Patent
Hsueh et al.

(10) Patent No.: US 10,923,690 B2
(45) Date of Patent: Feb. 16, 2021

(54) THIN FILM BATTERY, THIN FILM BATTERY MANUFACTURING METHOD AND REFINED MICROCRYSTALLINE ELECTRODE MANUFACTURING METHOD

(71) Applicant: Institute of Nuclear Energy Research, Atomic Energy Council, Executive Yuan, R.O.C, Taoyuan (TW)

(72) Inventors: Tien-Hsiang Hsueh, Taoyuan (TW); Yuh-Jenq Yu, Taoyuan (TW); Chi-Hung Su, Taoyuan (TW); Der-Jun Jan, Taoyuan (TW)

(73) Assignee: INSTITUTE OF NUCLEAR ENERGY RESEARCH, ATOMIC ENERGY COUNCIL, EXECUTIVE YUAN, R.O.C, Taoyuan (TW)

( * ) Notice: Subject to any disclaimer, the term of this patent is extended or adjusted under 35 U.S.C. 154(b) by 388 days.

(21) Appl. No.: 15/865,688

(22) Filed: Jan. 9, 2018

(65) Prior Publication Data
US 2019/0115567 A1 Apr. 18, 2019

(30) Foreign Application Priority Data
Oct. 17, 2017 (TW) .............................. 106135527 A

(51) Int. Cl.
*H01M 2/02* (2006.01)
*H01M 10/04* (2006.01)
(Continued)

(52) U.S. Cl.
CPC ....... *H01M 2/0207* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS

| 2007/0125638 A1* | 6/2007 | Zhang | H01M 4/667 |
| | | | 204/192.15 |
| 2008/0003496 A1* | 1/2008 | Neudecker | H01M 6/40 |
| | | | 429/122 |

(Continued)

OTHER PUBLICATIONS

Trask et al., "Optimization of 10μm, sputtered, LiCoO2 cathodes to enable higher energy density solid state batteries," J. Power Sources, 350 (2017) 56-64, available online Mar. 20, 2017 (Year: 2017).*

(Continued)

*Primary Examiner* — Amanda J Barrow
(74) *Attorney, Agent, or Firm* — Locke Lord LLP; Tim Tingkang Xia, Esq.

(57) ABSTRACT

A refined microcrystalline electrode manufacturing method is provided. The refined microcrystalline electrode manufacturing method includes the following step. First, an active material electrode layer is subjected to a conventional thermal annealing (CTA) process in an oxygen-containing environment at a first temperature interval to form an active material crystallization precursor; the active material crystallization precursor is subjected to a rapid thermal annealing (RTA) process in the oxygen-containing environment at a second temperature interval to form an active material coating layer with uniformly distributed fine microcrystal grains, wherein the temperature range of the second temperature interval is greater than the temperature range of the first temperature interval. In addition, a thin film battery and a thin film battery manufacturing method are also provided.

15 Claims, 11 Drawing Sheets

(51) Int. Cl.
  *H01M 4/04*      (2006.01)
  *H01M 10/0562*   (2010.01)
  *H01M 10/0585*   (2010.01)
  *H01M 10/0525*   (2010.01)
  *H01M 6/40*      (2006.01)

(52) U.S. Cl.
  CPC ... *H01M 10/0436* (2013.01); *H01M 10/0486* (2013.01); *H01M 10/0525* (2013.01); *H01M 10/0562* (2013.01); *H01M 10/0585* (2013.01); *H01M 6/40* (2013.01); *H01M 2220/30* (2013.01)

(56) References Cited

U.S. PATENT DOCUMENTS

2014/0294720 A1* 10/2014 Noguchi ............. C23C 18/1279 423/594.6
2015/0325862 A1* 11/2015 Song ....................... C23C 14/34 216/17
2016/0020484 A1* 1/2016 Hsueh ............... H01M 10/0436 429/124

OTHER PUBLICATIONS

Porthault et al., "Raman study of the spinel-to-layered phase transformation in sol-gel LiCoO2 cathode powders as a function of the post-annealing temperature," Vibrational Spectroscopy 62 (2012) 152-158, available online May 11, 2012 (Year: 2012).*

Oh et al., "Low-temperature preparation of ultrafine LiCoO2 powders by the sol-gel method," J. Material Science, 32 (1997) 3177-3182 (Year: 1997).*

Yoon et al., "Influence of Two-Step Heat Treatment on Sputtered Lithium Cobalt Oxide Thin Films," J. Electrochemical Society, 158 (12) A1313-1319 (2011) (Year: 2011).*

* cited by examiner

S100

S110 — depositing an active material on the conductive substrate to form an active material electrode layer S120 — enabling the active material electrode layer to be subjected to a conventional thermal annealing (CTA) process in an oxygen-containing environment at a first temperature interval to form a first active material crystallization precursor S130 — enabling the active material crystallization precursor to be subjected to a rapid thermal annealing (RTA) process in the oxygen-containing environment at a second temperature interval to form a first active material coating layer with uniformly distributed fine microcrystal grains

FIG. 7

THIN FILM BATTERY, THIN FILM BATTERY MANUFACTURING METHOD AND REFINED MICROCRYSTALLINE ELECTRODE MANUFACTURING METHOD

CROSS REFERENCE TO RELATED APPLICATION

This application also claims priority to Taiwan Patent Application No. 106135527 filed in the Taiwan Patent Office on Oct. 17, 2017, the entire content of which is incorporated herein by reference.

FIELD OF THE INVENTION

The present invention relates to a thin film battery, a thin film battery manufacturing method and a refined microcrystalline electrode manufacturing method, and more particularly, to a thin film battery of high cycle life, a thin film battery manufacturing method and a refined microcrystalline electrode manufacturing method.

BACKGROUND OF THE INVENTION

Nowadays, the use of thin film battery systems in wearable electronic devices and medical applications are growing rapidly. However, conventional colloidal or solid electrolyte thin film batteries, for example, lithium-ion batteries, have defects that capacitance cannot be improved due to low energy density when current density is high, and the use of such batteries with poor capacitance in battery systems will eventually cause the material cost and the volume of the battery systems to increase. Moreover, as batteries with short cycle life will require to be replaced more often, the cost for using such batteries is increased.

Therefore, there is a need of a battery with high cycle life and high capacitance under high current density, is free from the aforesaid two defects, and thus can enhance the industrialization of thin film battery cells.

SUMMARY OF THE INVENTION

The present invention provides a thin film battery, a thin film battery manufacturing method and a refined microcrystalline electrode manufacturing method, which can enable a thin film battery to have good charge-discharge cycle properties and improved capacitance density.

In an embodiment, the present invention provides a thin film battery manufacturing method, which comprises the following steps: depositing an active material on a conductive substrate by sputtering to form a first active material electrode layer; enabling the first active material electrode layer to be subjected to an annealing process, while allowing the annealing process to further include the following steps: enabling the first active material electrode layer to be subjected to a conventional thermal annealing (CTA) process in an oxygen-containing environment at a first temperature interval to form a first active material crystallization precursor; and enabling the first active material crystallization precursor to be subjected to a rapid thermal annealing (RTA) process in the oxygen-containing environment at a second temperature interval to form a first active material coating layer with uniformly distributed fine microcrystal grains, wherein the temperature range of the second temperature interval is greater than the temperature range of the first temperature interval; forming an electrolyte layer on the first active material coating layer; and forming an electrode layer on the electrolyte layer while allowing the electrode layer and the first active material coating layer to have opposite polarities.

In an embodiment, the present invention provides a refined microcrystalline electrode manufacturing method, which comprises the following steps: enabling an active material electrode layer to be subjected to a conventional thermal annealing (CTA) process in an oxygen-containing environment at a first temperature interval to form an active material crystallization precursor; and enabling the active material crystallization precursor to be subjected to a rapid thermal annealing (RTA) process in the oxygen-containing environment at a second temperature interval to form an active material coating layer with uniformly distributed fine microcrystal grains, wherein the temperature range of the second temperature interval is greater than the temperature range of the first temperature interval.

In an embodiment, the present invention provides a thin film battery, which comprises: a conductive substrate, a first active material coating layer, an electrolyte layer, and an electrode layer. The first active material coating layer is formed on the conductive substrate sequentially, first by a conventional thermal annealing (CTA) process in an oxygen-containing environment at a first temperature interval, and then by a rapid thermal annealing (RTA) process in the oxygen-containing environment at a second temperature interval, so as to enable the first active material coating layer to be formed with uniformly distributed fine microcrystal grains. The electrolyte layer is formed on the first active material coating layer. The electrode layer is formed on the electrolyte layer. Moreover, the electrode layer is formed with a polarity opposite to that of the first active material coating layer.

In an embodiment of the present invention, the first temperature interval is ranged between 300° C. and 500° C.

In an embodiment of the present invention, the second temperature interval is ranged between 500° C. and 900° C.

In an embodiment of the present invention, after the step for forming the first active material coating layer, a step for enabling the first active material coating layer to form at least one first protrusion electrode layer is performed.

In an embodiment of the present invention, before the step for depositing the active material on the conductive substrate, the method further comprises the following steps: providing a substrate; and enabling a first collector layer to be formed on the substrate so as to form the conductive substrate.

In an embodiment of the present invention, the forming of the first collector layer on the substrate further comprises the following steps: forming at least one first collector protrusion on the first collector layer.

In an embodiment of the present invention, the forming of the electrode layer on the electrolyte layer further comprises the following steps: forming a second active material coating layer on the electrolyte layer; and forming a second collector layer on the second active material coating layer.

In an embodiment of the present invention, before the step for forming the second collector layer on the second active material coating layer, the method further comprises the following steps: forming at least one second collector protrusion on the second collector layer while enabling each second collector protrusion to embed inside the second active material coating layer.

In an embodiment of the present invention, before the step for forming the first active material coating layer, the method further comprises the following steps: depositing an active material on the conductive substrate to form a third active material electrode layer; and enabling the third active electrode layer to be subjected to a conventional thermal annealing (CTA) process in the oxygen-containing environment to form a third active material coating layer with uniformly distributed coarse crystal grains, while enabling the third active material coating layer to be disposed between the conductive substrate and the first active material coating layer.

In an embodiment of the present invention, the conventional thermal annealing (CTA) process for forming the third active material coating layer is performed in a temperature interval ranged between 500° C. and 900° C.

In an embodiment of the present invention, after the step for forming the third active material coating layer, a step for enabling the third active material coating layer to form at least one third protrusion electrode layer is performed.

In an embodiment of the present invention, the step for forming the electrolyte layer on the first active material coating layer further comprises the following step: forming at least one electrolyte protrusion on the electrolyte layer.

In an embodiment of the present invention, the first active material coating layer includes at least one first protrusion electrode layer.

In an embodiment of the present invention, the first active material coating layer is substantially a laminar electrode.

In an embodiment of the present invention, the first active material coating layer is substantially a protrusion electrode.

In an embodiment of the present invention, the conductive substrate further comprises: a substrate and a first collector layer, wherein the first collector layer is disposed on the substrate.

In an embodiment of the present invention, the first collector layer further comprises: at least one collector protrusion.

In an embodiment of the present invention, the electrolyte layer further comprises: at least one electrolyte protrusion.

In an embodiment of the present invention, the electrode layer further comprises: a second active material coating layer and a second collector layer, wherein the second active material coating layer is disposed on the electrolyte layer while the second collector layer is disposed on the second active material coating layer.

In an embodiment of the present invention, the second collector layer further comprises: at least one second collector protrusion, wherein each second collector protrusion is formed embedded inside the second active material coating layer.

In an embodiment of the present invention, the thin film battery further comprises: a third active material coating layer, formed at a position between the conductive substrate and the first active material coating layer; wherein the third active material coating layer is formed by a conventional thermal annealing (CTA) process in an oxygen-containing environment.

In an embodiment of the present invention, the third active material coating layer further comprises: at least one third protrusion electrode layer.

From the above description, it is noted that the present invention can provide a thin film battery, a thin film battery manufacturing method and a refined microcrystalline electrode manufacturing method. Operationally, there are active material coating layers being formed by a two-stage annealing process. That is, first a conventional thermal annealing (CTA) process is performed in an oxygen-containing environment at a lower first temperature interval so as to form an active material crystallization precursor, where the annealing time for the CTA process is comparatively longer and is performed under a slower temperature raising and decreasing rate, the charge-discharge cycle properties of the resulted thin film battery are improved; and then a rapid thermal annealing (RTA) process is performed in the oxygen-containing environment at a higher second temperature interval, where the annealing time for the RTA process is comparatively shorter and is performed under a rapid temperature raising and decreasing rate. By this two-stage annealing process, an active material coating layer with uniformly distributed fine microcrystal grains is formed. It is noted that by the formation of the uniformly distributed fine microcrystal grains, the strength of the polycrystalline materials is enhanced and thus eventually the toughness and formability of the active material coating layer is improved for allowing the same to have more uniform deformation without causing any local stress to be overly concentrated. Therefore, the formation of the active material coating layer can prevent the electrolyte layer from cracking, such that the destructive tree-like channel generally caused by the cracking can be prevented and thus the performance of the thin film battery can be ensured. Overall, the performance of the thin film battery is enhanced and the charge-discharge cycle properties of the resulted thin film battery are improved.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed is description given herein below and the accompanying drawings which are given by way of illustration only, and thus are not limitative of the present invention and wherein:

FIG. 7 is a flow chart depicting the steps performed in a refined microcrystalline electrode manufacturing method according to the present invention.

DESCRIPTION OF THE EXEMPLARY EMBODIMENTS

To further understand and recognize the fulfilled functions and structural characteristics of the invention, several exemplary embodiments cooperating with detailed description are presented as the follows.

Figure 1:
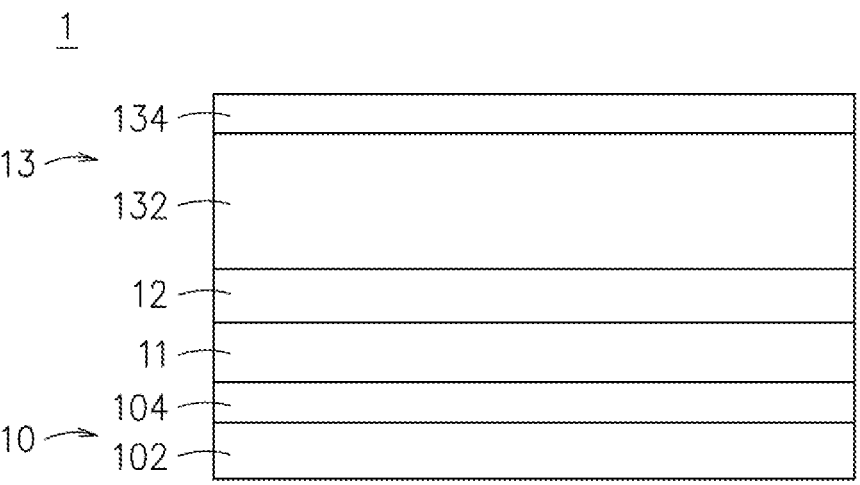
FIG. 1 is a schematic diagram showing a thin film battery according to a first embodiment of the present invention.

FIG. 1 is a schematic diagram showing a thin film battery according to a first embodiment of the present invention. As shown in FIG. 1, a thin film battery 1 comprises: a conductive substrate 10, a first active material coating layer 11, an electrolyte layer 12, and an electrode layer 13. The conductive substrate 10 further comprises a substrate 102 and a first collector layer 104 that is formed on the substrate 102. In this embodiment, the substrate 102 can made of a conductive material, but in another embodiment, it can be a substrate made of an insulating material coated with a conductive material, or even. In a further embodiment, the substrate 102 can be a semiconductor substrate or a flexible substrate.

In this embodiment, the first active material coating layer 11 is disposed on the first collector layer 104 of the conductive substrate 10, wherein the first active material coating layer 11 is substantially a laminar electrode, i.e. the laminar electrode is a single-layered structure. Moreover, the first active material coating layer 11 is formed on the conductive substrate 10, first by a conventional thermal annealing (CTA) process in an oxygen-containing environment at a first temperature interval, and then by a rapid thermal annealing (RTA) process in the oxygen-containing environment at a second temperature interval, where the temperature range of the second temperature interval is greater than the temperature range of the first temperature interval.

In detail, an active material is first provided to be deposited on a conductive substrate into a first active material coating layer, wherein the active material can be $LiMn_2O_4$, $LiCoO_2$, $LiFePO_4$, $LiNiO_2$, C, Si, $SnO_2$, $TiO_2$, or other derivative elements, alloys, or compounds. Then, the first active material coating layer is subjected to a conventional thermal annealing (CTA) process in an oxygen-containing environment at a first temperature interval ranged between 300° C. and 500° C. for at least 30 min so as to form a first active material crystallization precursor. Thereafter, the first active material crystallization precursor is subjected to a rapid thermal annealing (RTA) process in the oxygen-containing environment at a second temperature interval, that is ranged between 500° C. and 900° C., so as to form the first active material coating layer 11. Moreover, as the RTA process is performed within a very short period of time, the first active material coating layer 11 is formed with uniformly distributed fine microcrystal grains.

In this embodiment, the electrolyte layer 12 is formed on the first active material coating layer 11, whereas the electrolyte layer 12 can be a layer of colloidal or solid electrolyte. The electrode layer 13 is formed on the electrolyte layer 12, in a manner that the electrode layer 13 is formed with a polarity opposite to that of the first active material coating layer 11. For instance, if the electrode layer 13 is an anode electrode layer, the electrode that is the construction of the first active material coating layer 11 and the conductive substrate 10 will be a cathode electrode layer; and vice versa. The electrode layer 13 further includes a second active material coating layer 132 and a second collector layer 134 in a manner that the second active material coating layer 132 is formed on the electrolyte layer 12 while the second collector layer 134 is formed on the second active material coating layer 132. In this embodiment, the second active material coating layer 132 can be formed either by a conventional thermal annealing (CTA) process or by a rapid thermal annealing (RTA) process. Nevertheless, in another embodiment, the second active material coating layer can be formed in a way similar to the formation of the first active material coating layer, so that the formation of the second active material coating layer is not restricted to any specific process.

By the use of the aforesaid configuration, the active material coating layer 11 of the present invention is formed by a two-stage annealing process. That is, first a conventional thermal annealing (CTA) process is performed in an oxygen-containing environment at a lower first temperature interval so as to form an active material crystallization precursor, and then a rapid thermal annealing (RTA) process is performed in the oxygen-containing environment at a higher second temperature interval so as to form the first active material coating layer 11 with uniformly distributed fine microcrystal grains. As the annealing time for the CTA process is comparatively longer and is performed under a slower temperature raising and decreasing rate, the charge-discharge cycle properties of the resulted thin film battery 1 are improved; and moreover, as the annealing time for the RTA process is comparatively shorter and is performed under a rapid temperature raising and decreasing rate, the first active material coating layer 11 can be formed with uniformly distributed fine microcrystal grains. It is noted that by the formation of the uniformly distributed fine microcrystal grains, the strength of the polycrystalline materials is enhanced and thus eventually the toughness and formability of the first active material coating layer 11 is improved for allowing the same to have more uniform deformation without causing any local stress to be overly concentrated. Therefore, the formation of the first active material coating layer 11 can prevent the electrolyte layer 12 from cracking, by that the destructive tree-like channel generally caused by the cracking can be prevented and thus the performance of the thin film battery 1 can be ensured. Overall, the performance of the thin film battery is enhanced and the charge-discharge cycle properties of the resulted thin film battery 1 are improved.

Figure 2:
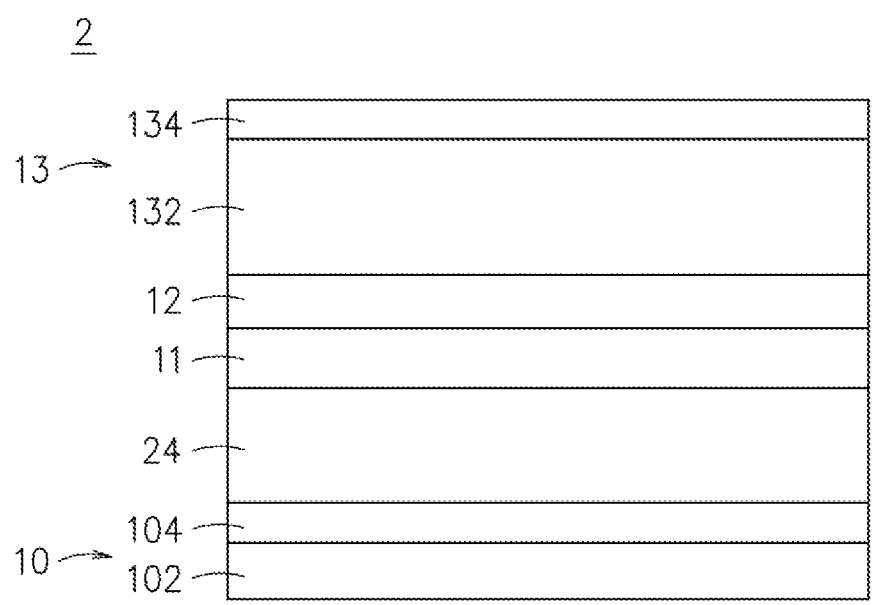
FIG. 2 is a schematic diagram showing a thin film battery according to a second embodiment of the present invention.

FIG. 2 is a schematic diagram showing a thin film battery according to a second embodiment of the present invention. It is noted that the thin film battery 2 of FIG. 2 is formed similar to the thin film battery 1 of FIG. 1, and therefore similar components of the same function will not be described further, but only the differences between the two will be provided herein. In this embodiment, the thin film battery 2 further comprise a third active material coating layer 24, which is being disposed at a position between the first collector layer 104 of the conductive substrate 10 and the first active material coating layer 11. The third active material coating layer 24 is substantially a laminar electrode, i.e. is the third active material coating layer 24 a single-layered structure.

In this embodiment, the third active material coating layer 24 is formed by a conventional thermal annealing (CTA) process in an oxygen-containing environment at a temperature interval ranged between 500° C. and 900° C. for at least 30 min. Comparing to the uniformly distributed fine microcrystal grains of the first active material coating layer 11, the third active material coating layer 24 is formed with crystal grains that are comparatively larger but are also uniformly distributed. Thereby, the thin film battery is substantially a two-layered structure with the first active material coating layer 11 and the third active material coating layer 24.

Figure 3:
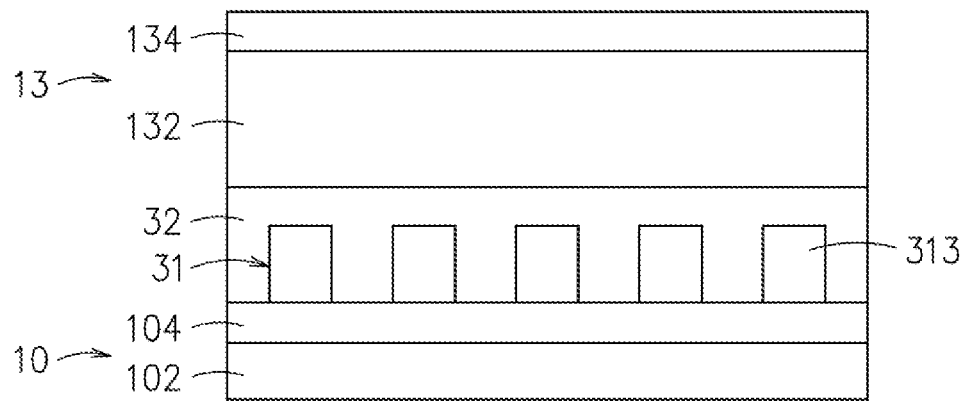
FIG. 3 is a schematic diagram showing a thin film battery according to a third embodiment of the present invention.

FIG. 3 is a schematic diagram showing a thin film battery according to a third embodiment of the present invention. It is noted that the thin film battery 3 of FIG. 3 is formed similar to the thin film battery 1 of FIG. 1, and therefore similar components of the same function will not be described further, but only the differences between the two will be provided herein. In this embodiment, the first active material coating layer 31 of the thin film battery 3 further includes at least one first protrusion electrode layer 313, which is formed on the first collector layer 104 while being embedded inside the electrolyte layer 32 for enabling the first active material coating layer 31 to be formed as a protrusion electrode.

In this embodiment, the first protrusion electrode layer 313 is formed as a rectangular body, but in other embodiments, it can be formed as a trapezoid-shaped body, a cylinder, a hollow column, a ring, a finger-like body, or any other shapes. In addition, the first protrusion electrode layer 313 can be formed by a masking process, an etching process, a screen-printing process, a nano-imprint process, a photoresist process, or a laser dicing process, that is operating cooperatively with a vacuum thermal evaporation process, a radio-frequency sputtering process, a radio-frequency magnetron sputtering process, a high-frequency sputtering process, a high-frequency magnetron sputtering process, a chemical vapor deposition process, an electrostatic spray deposition process, or a pulsed laser deposition process.

Figure 4:
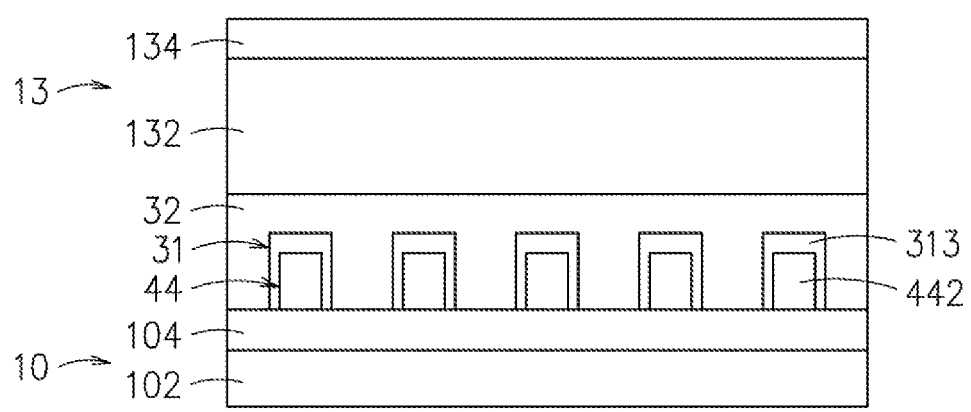
FIG. 4 is a schematic diagram showing a thin film battery according to a fourth embodiment of the present invention.

FIG. 4 is a schematic diagram showing a thin film battery according to a fourth embodiment of the present invention. It is noted that the thin film battery 4 of FIG. 4 is formed similar to the thin film battery 3 of FIG. 3, and therefore similar components of the same function will not be described further, but only the differences between the two will be provided herein. In this embodiment, the third active material coating layer 44 of the thin film battery 4 further includes at least one third protrusion electrode layer 442, which is formed on the first collector layer 104 while being embedded inside the first protrusion electrode layer 313 as the first protrusion electrode layer 313 is embedded inside the electrolyte layer 32, by that the first active material coating layer 31 and the third active material coating layer 44 are formed respectively as a protrusion electrode.

Similarly, in this embodiment, the third protrusion electrode layer 442 is formed as a rectangular body, but in other embodiments, it can be formed as a trapezoid-shaped body, a cylinder, a hollow column, a ring, a finger-like body, or any other shapes. In addition, the third protrusion electrode layer 442 can be formed by a masking process, an etching process, a screen-printing process, a nano-imprint process, a photoresist process, or a laser dicing process, that is operating cooperatively with a vacuum thermal evaporation process, a radio-frequency sputtering process, a radio-frequency magnetron sputtering process, a high-frequency sputtering process, a high-frequency magnetron sputtering process, a chemical vapor deposition process, an electrostatic spray deposition process, or a pulsed laser deposition process.

Figure 5:
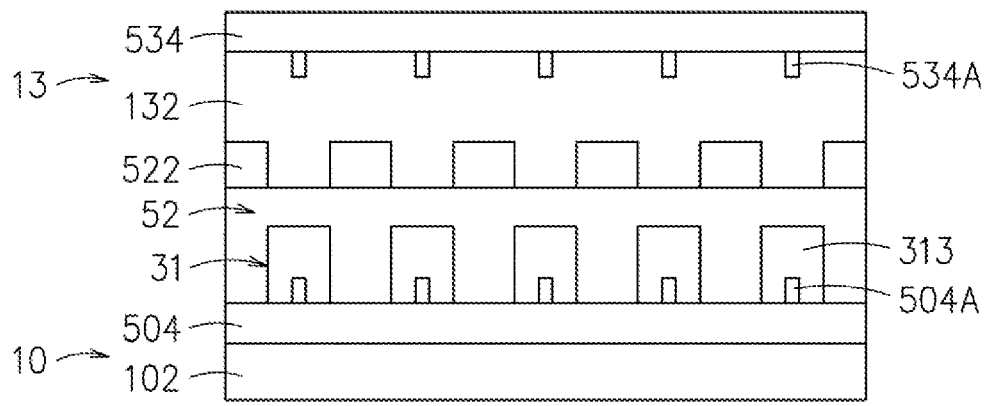
FIG. 5 is a schematic diagram showing a thin film battery according to a fifth embodiment of the present invention.

FIG. 5 is a schematic diagram showing a thin film battery according to a fifth embodiment of the present invention. It is noted that the thin film battery 5 of FIG. 5 is formed similar to the thin film battery 3 of FIG. 3, and therefore similar components of the same function will not be described further, but only the differences between the two will be provided herein. In this embodiment, the electrolyte layer 52 further comprises: at least one electrolyte protrusion 552, which is formed as a rectangular body, but in other embodiments, it can be formed as a trapezoid-shaped body, a cylinder, a hollow column, a ring, a finger-like body, or any other shapes. In addition, the electrolyte protrusion 552 can be formed by a masking process, an etching process, a screen-printing process, a nano-imprint process, a photoresist process, or a laser dicing process, that is operating cooperatively with a vacuum thermal evaporation process, a radio-frequency sputtering process, a radio-frequency magnetron sputtering process, a high-frequency sputtering process, a high-frequency magnetron sputtering process, a chemical vapor deposition process, an electrostatic spray deposition process, or a pulsed laser deposition process.

In this embodiment, the first collector layer 504 includes at least one first collector protrusion 504A, which is formed as a rectangular body, but in other embodiments, it can be formed as a trapezoid-shaped body, a cylinder, a hollow column, a ring, a finger-like body, or any other shapes. In addition, the first collector protrusion 504A can be formed by a masking process, an etching process, a screen-printing process, a nano-imprint process, a photoresist process, or a laser dicing process, that is operating cooperatively with a vacuum thermal evaporation process, a radio-frequency sputtering process, a radio-frequency magnetron sputtering process, a high-frequency sputtering process, a high-frequency magnetron sputtering process, a chemical vapor deposition process, an electrostatic spray deposition process, or a pulsed laser deposition process.

Moreover, in this embodiment, the second collector layer 534 includes at least one second collector protrusion 534A, which is formed as a rectangular body, but in other embodiments, it can be formed as a trapezoid-shaped body, a cylinder, a hollow column, a ring, a finger-like body, or any other shapes. In addition, the second collector protrusion 534A can be formed by a masking process, an etching process, a screen-printing process, a nano-imprint process, a photoresist process, or a laser dicing process, that is operating cooperatively with a vacuum thermal evaporation process, a radio-frequency sputtering process, a radio-frequency magnetron sputtering process, a high-frequency sputtering process, a high-frequency magnetron sputtering process, a chemical vapor deposition process, an electrostatic spray deposition process, or a pulsed laser deposition process.

In this embodiment, the first collector protrusion 504A is embedded inside the first protrusion electrode layer 313 of the first active material coating layer 31, the second collector protrusion 534A is embedded inside the second active material coating layer 132, and the electrolyte protrusion 522 is embedded inside the second active material coating layer 132. Both the first collector protrusion 504A and the second collector protrusion 534A are formed for improving the surface adhesive force between the first active material coating layer 31 to the first collector layer 104 and the surface adhesive force between the second active material coating layer 132 to the second collector layer 134, and thus for enhancing the electron-current/hole-current collecting ability of the first active material coating layer 31 and the second active material coating layer 132.

Moreover, the electrolyte layer 52, the first active material coating layer 31 and the second active material coating layer 132 that are formed as a protrusive structures in this embodiment are designed for increasing the contact areas between the first active material coating layer 31, the second active material coating layer 132 and the electrolyte layer 52, by that a multi-directional ion conduction is enabled so as to improve the conduction efficiency between the electrolyte layer 52. Thereby, not only the capacitance of the thin film battery 5 can be increased for enabling the same to be charging and discharging under high current density, but also the energy density of the thin film battery 5 is increased.

Figure 6:
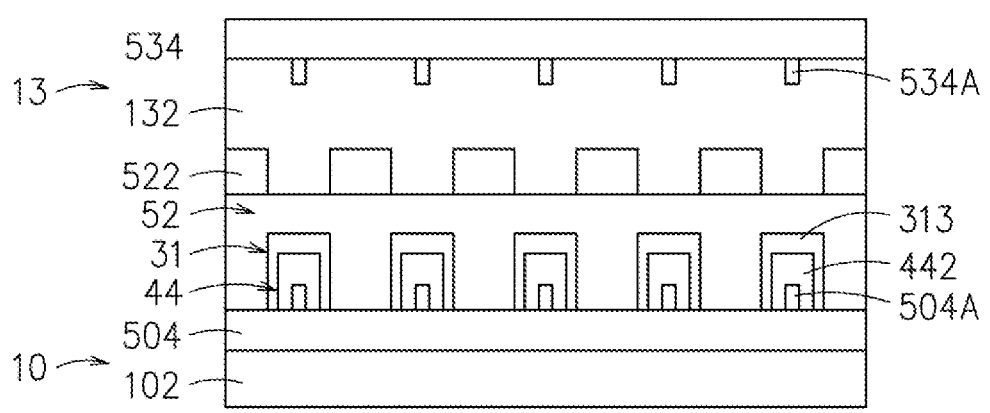
FIG. 6 is a schematic diagram showing a thin film battery according to a sixth embodiment of the present invention.

FIG. 6 is a schematic diagram showing a thin film battery according to a sixth embodiment of the present invention. It is noted that the thin film battery 6 of FIG. 6 is formed similar to the thin film battery 5 of FIG. 5, and therefore similar components of the same function will not be described further, but only the differences between the two will be provided herein. In this embodiment, the first collector protrusion 504A is embedded inside the third protrusion electrode layer 442 of the third active material coating layer 44, the third protrusion electrode layer 442 is embedded inside the first protrusion electrode layer 313 of the first active material coating layer 31, the first protrusion electrode layer 313 is embedded inside the electrolyte layer 52, and the electrolyte protrusion 522 is embedded inside the second active material coating layer 132.

Figure 8A:
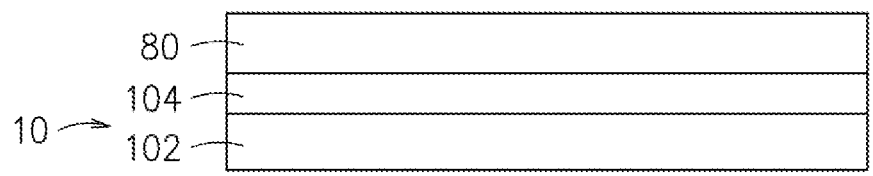
FIG. 8A to FIG. 8C are schematic diagrams showing the manufacturing of the refined microcrystalline electrode of the present invention at different stages.
Figure 8B:
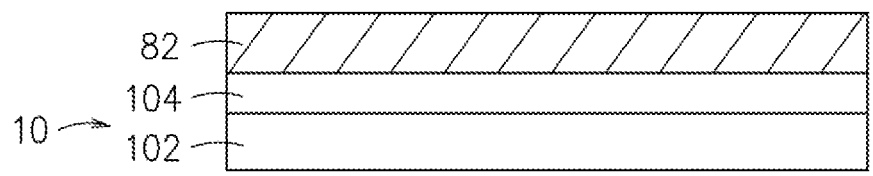
Figure 8C:
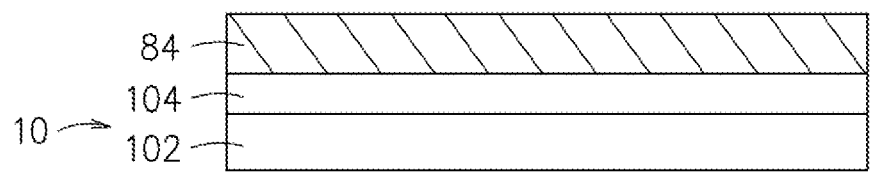

FIG. 7 is a flow chart depicting the steps performed in a refined microcrystalline electrode manufacturing method according to the present invention, and FIG. 8A to FIG. 8C are schematic diagrams showing the manufacturing of the refined microcrystalline electrode of the present invention at different stages. In FIG. 7, the refined microcrystalline electrode manufacturing method S100 includes step S110 to step S130. At step S110, an active material is deposited on a conductive substrate 10 so as to form an active material electrode layer 80. As shown in FIG. 8A, the active material electrode layer 80 is formed by depositing an active material on a conductive substrate 10, whereas the active material can be a material selected from the group consisting of: $LiMn_2O_4$, $LiCoO_2$, $LiFePO_4$, $LiNiO_2$, C, Si, $SnO_2$, $TiO_2$, or other derivative elements, alloys, or compounds. The conductive substrate 10 comprises a substrate 102 and a first collector layer 104 that is formed on the substrate 102. In this embodiment, the substrate is made of a conducting material, but in other embodiments, the substrate can be made of an insulating material that is coated with a conducting material, or it can be a semiconductor substrate or a flexible substrate.

At step S120, the active material electrode layer 80 is subjected to a conventional thermal annealing (CTA) process in an oxygen-containing environment at a first temperature interval to form a first active material crystallization precursor 82. As shown in FIG. 8B, the active material electrode layer 80 is subjected to the conventional thermal annealing (CTA) process in the oxygen-containing environment at the temperature interval ranged between 300° C. and 500° C. for at least 30 min so as to form the active material crystallization precursor 82.

At step S130, the active material crystallization precursor 82 is subjected to a rapid thermal annealing (RTA) process in the oxygen-containing environment at a second temperature interval to form an active material coating layer 84 with uniformly distributed fine microcrystal grains. As shown in FIG. 8C, the active material crystallization precursor 82 is subjected to a rapid thermal annealing (RTA) process at the second temperature interval ranged between 500° C. and 900° C. for at most 3 min so as to form the active material coating layer 84. Moreover, as the RTA process is performed within a very short period of time, the active material coating layer 84 is formed with uniformly distributed fine microcrystal grains. Overall, the refined microcrystalline electrode manufacturing method S100 of the present invention provides a two-stage annealing process to produce the active material coating layer 84 with uniformly distributed fine microcrystal grains that can be applied in the manufacturing of thin film batteries.

Figure 9:
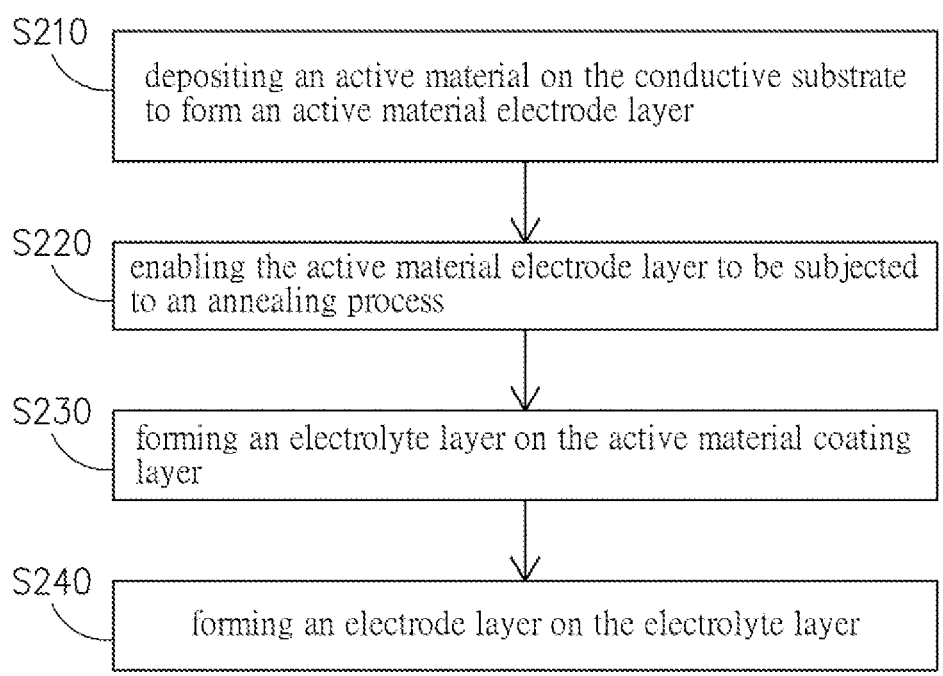
FIG. 9 is a flow chart depicting the steps for manufacturing the thin film battery of the present invention.
Figure 10A:
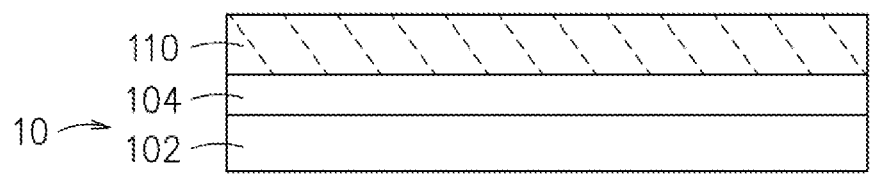
FIG. 10A to FIG. 10N are schematic diagrams showing the manufacturing of the thin film battery of the present invention at different stages.

FIG. 9 is a flow chart depicting the steps for manufacturing the thin film battery of the present invention. FIG. 10A to FIG. 10N are schematic diagrams showing the manufacturing of the thin film battery of the present invention at different stages.

In the embodiment shown in FIG. 9, a thin film battery manufacturing method S200 is provided and can be used for manufacturing the thin film batteries 1~6 that are shown in FIG. 1 to FIG. 6. The following description is illustrated using the thin film battery 1 of FIG. 1 as an example. In FIG. 9, the thin film battery manufacturing method S200 comprises the step S210~step S240. At step S210, an active material is deposited on a conductive substrate 10 so as to form a first active material electrode layer 110.

As shown in FIG. 10A, the first active material electrode layer 110 is formed by depositing the active material on the conductive substrate 10 by a manufacturing means, such as a vacuum thermal evaporation process, a radio-frequency sputtering process, a radio-frequency magnetron sputtering process, a high-frequency sputtering process, a high-frequency magnetron sputtering process, a chemical vapor deposition process, an electrostatic spray deposition process, or a pulsed laser deposition process, whereas the active material can be $LiMn_2O_4$, $LiCoO_2$, $LiFePO_4$, $LiNiO_2$, C, Si, $SnO_2$, $TiO_2$, or other derivative elements, alloys, or compounds. Nevertheless, before the proceeding of the depositing of the active material on the conductive substrate 10 to form the first active material electrode layer 110, the method S200 further include the following steps: providing a substrate 102; and enabling a first collector layer 104 to be formed on the substrate 102 so as to form the conductive substrate 10. In this embodiment, the substrate 102 can made of a conductive material, but in another embodiment, it can be a substrate made of an insulating material coated with a conductive material, or even the substrate 102 can be a semiconductor substrate or a flexible substrate.

Figure 10B:
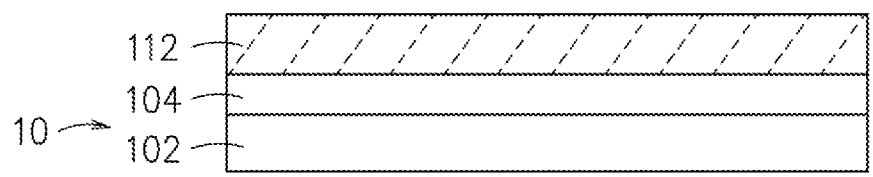
Figure 10C:
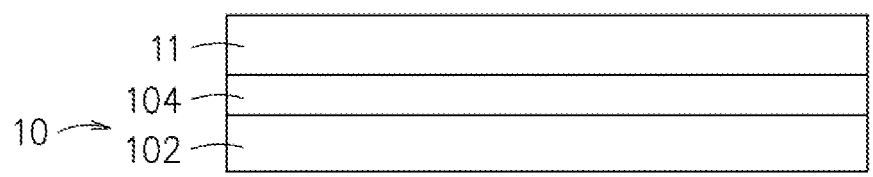

At step S220, the first active material electrode layer 110 is subjected to an annealing process, which can further include the following steps: enabling the first active material electrode layer 110 to be subjected to a conventional thermal annealing (CTA) process in an oxygen-containing environment at a first temperature interval to form a first active material crystallization precursor 112, as shown in FIG. 10B, whereas the first temperature interval is ranged between 300° C. to 500° C.; and enabling the first active material crystallization precursor 112 to be subjected to a rapid thermal annealing (RTA) process in the oxygen-containing environment at a second temperature interval to form a first active material coating layer 11, as shown in FIG. 10C, whereas the temperature range of the second temperature interval is greater than the temperature range of the first temperature interval, and in this embodiment the second temperature interval is ranged between 500° C. to 900° C.

Operationally, the first active material coating layer 11 of the present invention is being formed by a two-stage annealing process as illustrated in step S220. That is, first the first active material electrode layer 110 is subjected to a conventional thermal annealing (CTA) process in an oxygen-containing environment at a lower first temperature interval between 300° C. to 500° C. for at least 30 min so as to form a first active material crystallization precursor 112; and then the first active material crystallization precursor 112 is subjected to a rapid thermal annealing (RTA) process in the oxygen-containing environment at a higher second temperature interval between 500° C. to 900° C. for at most 3 min, so as to form the first active material coating layer 11 with uniformly distributed fine microcrystal grains. Overall, as the annealing time for the CTA process is comparatively longer and is performed under a slower temperature raising and decreasing rate, the charge-discharge cycle properties of the resulted thin film battery are improved, and moreover, as the annealing time for the RTA process is comparatively shorter and is performed under a rapid temperature raising and decreasing rate, the first active material coating layer 11 with uniformly distributed fine microcrystal grains can be formed. It is noted that by the formation of the uniformly distributed fine microcrystal grains, the strength of the polycrystalline materials is enhanced and thus eventually the toughness and formability of the first active material coating layer 11 is improved for allowing the same to have more uniform deformation without causing any local stress to be overly concentrated. Therefore, the formation of the active material coating layer can prevent the electrolyte layer from cracking, by that the destructive tree-like channel generally caused by the cracking can be prevented and thus the performance of the thin film battery can be ensured. Overall, the performance of the thin film battery is enhanced and the charge-discharge cycle properties of the resulted thin film battery are improved.

Figure 10D:
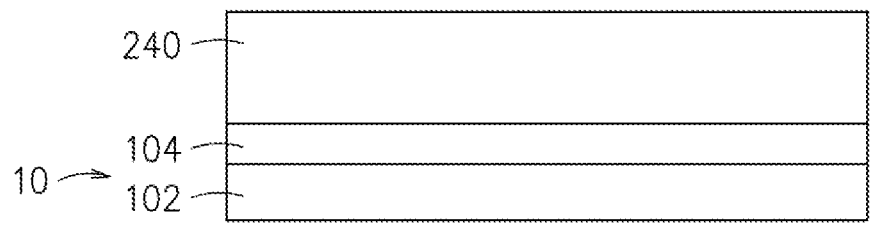
Figure 10E:
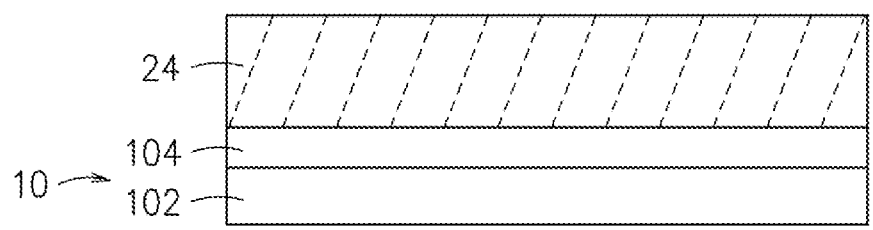
Figure 10F:
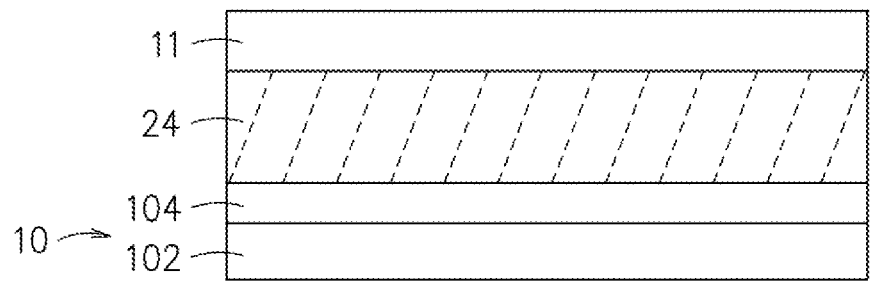

In another embodiment, before the forming of the first active material coating layer 11, the method of the present invention further include the following steps: depositing an active material on the conductive substrate 10 so as to form a third active material electrode layer 240, as shown in FIG. 10D, whereas the active material can be a material selected from the group consisting of: $LiMn_2O_4$, $LiCoO_2$, $LiFePO_4$, $LiNiO_2$, C, Si, $SnO_2$, $TiO_2$, or other derivative elements, alloys, or compounds; and then enabling the third active electrode layer 240 to be subjected to a conventional thermal annealing (CTA) process in the oxygen-containing environment under a temperature interval ranged between 500° C. to 900° C. for at least 30 min so as to form a third active material coating layer 24, as shown in FIG. 10E, while enabling the third active material coating layer 24 to be disposed between the conductive substrate 10 and the first active material coating layer 11, as shown in FIG. 10F.

In an embodiment of the present invention, the conventional thermal annealing (CTA) process for forming the third active material coating layer is performed in a temperature interval ranged between 500° C. and 900° C. Comparing to the uniformly distributed fine microcrystal grains of the first active material coating layer 11, the third active material coating layer 24 is formed with crystal grains that are comparatively larger but are also uniformly distributed. Thereby, a two-layered structure with the first active material coating layer 11 and the third active material coating layer 24 is achieved.

Figure 10G:
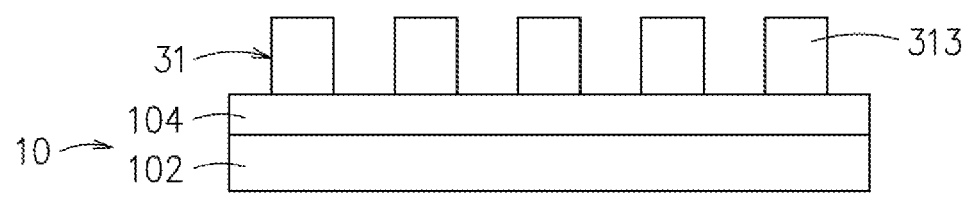

In another embodiment, after the forming of the first active material coating layer 11, the method of the present invention further include the following steps: enabling at least one first protrusion electrode layer 313 to be formed on the first active material coating layer 31, as shown in FIG. 10G, for enabling the first active material coating layer 31 to become substantially as a protrusion electrode. It is noted that the forming of the first protrusion electrode layer 313 can be achieved by a masking process, an etching process, a screen-printing process, a nano-imprint process, a photoresist process, or a laser dicing process, that is operating cooperatively with a vacuum thermal evaporation process, a radio-frequency sputtering process, a radio-frequency magnetron sputtering process, a high-frequency sputtering process, a high-frequency magnetron sputtering process, a chemical vapor deposition process, an electrostatic spray deposition process, or a pulsed laser deposition process.

Figure 10H:
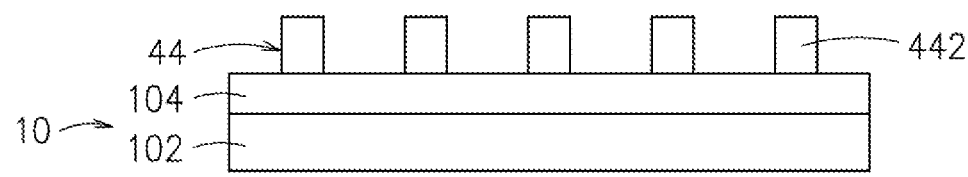
Figure 10I:
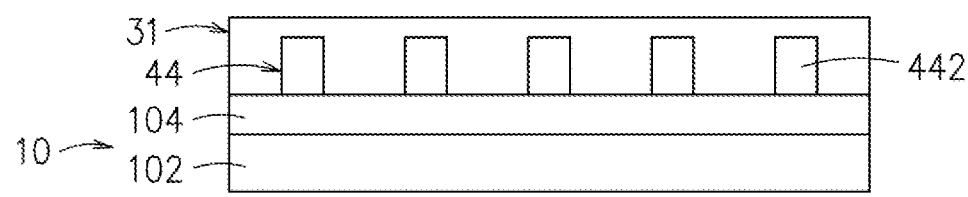
Figure 10J:
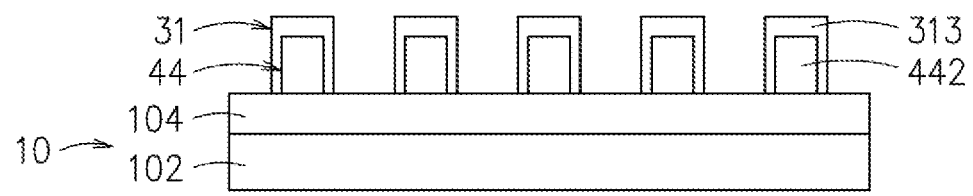

In another embodiment, after the forming of the third active material coating layer 44, the method of the present invention further include the following steps: enabling at least one third protrusion electrode layer 442 to be formed on the third active material coating layer 44, as shown in FIG. 10H, for enabling the third active material coating layer 44 to become substantially as a protrusion electrode; then forming the first active material coating layer 31 on the third active material coating layer 44 while enabling the third protrusion electrode layer 442 to be embedded inside the first active material coating layer 31, as shown in FIG. 10I, and then, forming at least one first protrusion electrode layer 313 in a manner that the third protrusion electrode layer 442 is embedded inside the first protrusion electrode layer 313, as shown in FIG. 10J. Similarly, it is noted that the forming of the third protrusion coating layer 44 can be achieved by a masking process, an etching process, a screen-printing process, a nano-imprint process, a photoresist process, or a laser dicing process, that is operating cooperatively with a vacuum thermal evaporation process, a radio-frequency sputtering process, a radio-frequency magnetron sputtering process, a high-frequency sputtering process, a high-frequency magnetron sputtering process, a chemical vapor deposition process, an electrostatic spray deposition process, or a pulsed laser deposition process.

Figure 10K:
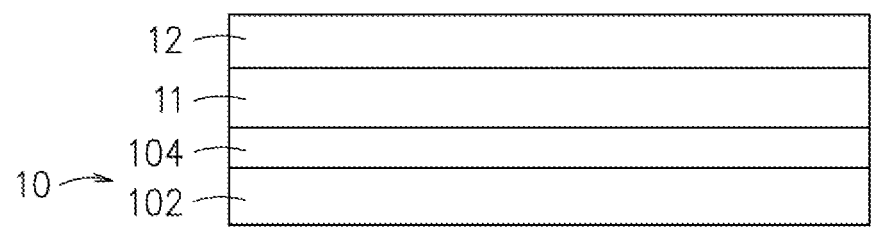

At step S230, as shown in FIG. 9 and FIG. 10K, an electrolyte layer 12 is formed on the first active material coating layer 11, wherein the electrolyte layer 12 can be in a colloidal or solid state. In another embodiment, the electrolyte layer 32 is formed on the first active material coating layer 31 of FIG. 10G while enabling the first protrusion electrode layer 313 to be embedded inside the electrolyte layer 32, as shown in FIG. 3; or the electrolyte layer 32 is formed on the first active material coating layer 31 of FIG. 10J, as shown in FIG. 4; or even the electrolyte layer 12 is formed on the first active material coating layer 11 of FIG. 10F, as shown in FIG. 2.

Figure 10L:
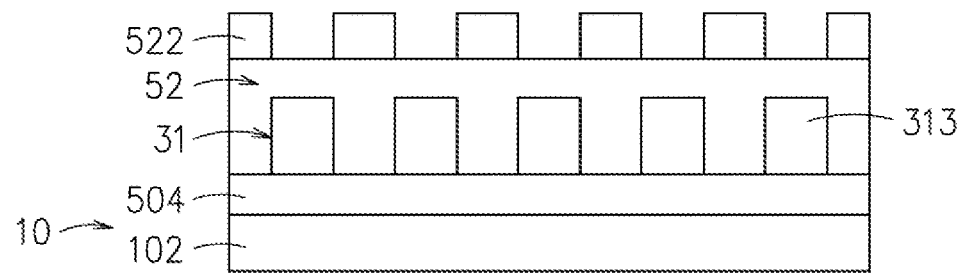

In another embodiment of the present invention, the step for forming the electrolyte layer on the first active material coating layer further comprises the following step: forming at least one electrolyte protrusion 552 on the electrolyte layer 52, as shown in FIG. 10L. Moreover, the forming of the electrolyte protrusion 552 can be achieved by a masking process, an etching process, a screen-printing process, a nano-imprint process, a photoresist process, or a laser dicing process, that is operating cooperatively with a vacuum thermal evaporation process, a radio-frequency sputtering process, a radio-frequency magnetron sputtering process, a high-frequency sputtering process, a high-frequency magnetron sputtering process, a chemical vapor deposition process, an electrostatic spray deposition process, or a pulsed laser deposition process. In addition, in another embodiment, the electrolyte layer is formed on the first active material coating layer 31 of FIG. 10J, and then the electrolyte protrusion 522 is formed on the electrolyte layer 52.

At step S240, as shown in FIG. 9, an electrode layer 13 is formed on the electrolyte layer 12, while allowing the electrode layer 13 and the first active material coating layer 11 to have opposite polarity. In another word, if the electrode layer 13 is an anode layer, the electrode of the first active material coating layer 11 and the conductive substrate will be a cathode electrode; and vice versa.

Figure 10M:
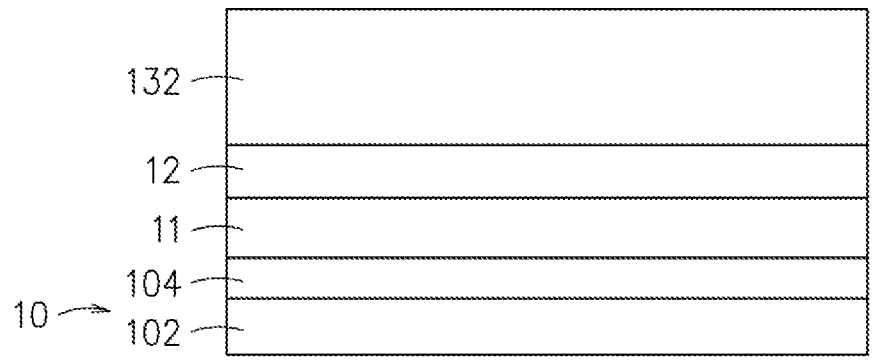
Figure 10N:
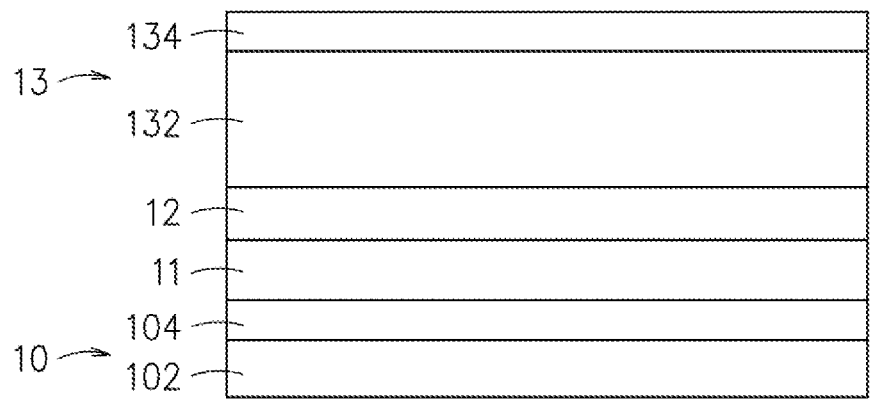

In this embodiment, the forming of the electrode layer 13 further include the following steps: forming a second active material coating layer 132 on the electrolyte layer 12, as shown in FIG. 10M; and forming a second collector layer 134 on the second active material coating layer 132, as shown in FIG. 10N. In this embodiment, the second active material coating layer 132 can be formed either by a conventional thermal annealing (CTA) process or by a rapid thermal annealing (RTA) process. Nevertheless, in another embodiment, the second active material coating layer can be formed in a way similar to the formation of the first active material coating layer, so that the formation of the second active material coating layer is not restricted to any specific process.

In another embodiment, the method for manufacturing thin film batteries further includes the following steps: forming at least one first collector protrusion 504A on the first collector layer 504 in a manner that the first collector protrusion 504A is embedded inside the first protrusion electrode layer 313, as shown in FIG. 5, or the first collector protrusion 504A is embedded inside the third protrusion electrode layer 442, as shown in FIG. 6; and forming at least one second collector protrusion 534A on the second collector layer 534 in a manner that the second collector protrusion 534A is embedded inside the second active material coating layer 132. Both the first collector protrusion 504A and the second collector protrusion 534A are formed for improving the surface adhesive force between the first active material coating layer 31 to the first collector layer 104 and the surface adhesive force between the second active material coating layer 132 to the second collector layer 134, and thus for enhancing the electron-current/hole-current collecting ability of the first active material coating layer 31 and the second active material coating layer 132.

To sum up, the present invention provides a thin film battery, a thin film battery manufacturing method and a refined microcrystalline electrode manufacturing method. Operationally, there are active material coating layers being formed by a two-stage annealing process. That is, first a conventional thermal annealing (CTA) process is performed in an oxygen-containing environment at a lower first temperature interval so as to form an active material crystallization precursor, where the annealing time for the CTA process is comparatively longer and is performed under a slower temperature raising and decreasing rate, the charge-discharge cycle properties of the resulted thin film battery are improved; and then a rapid thermal annealing (RTA) process is performed in the oxygen-containing environment at a higher second temperature interval, where the annealing time for the RTA process is comparatively shorter and is performed under a rapid temperature raising and decreasing rate, an active material coating layer with uniformly distributed fine microcrystal grains is formed. It is noted that by the formation of the uniformly distributed fine microcrystal grains, the strength of the polycrystalline materials is enhanced and thus eventually the toughness and formability of the active material coating layer is improved for allowing the same to have more uniform deformation without causing any local stress to be overly concentrated. Therefore, the formation of the active material coating layer can prevent the electrolyte layer from cracking, by that the destructive tree-like channel generally caused by the cracking can be prevented and thus the performance of the thin film battery can be ensured. Overall, the performance of the thin film battery is enhanced and the charge-discharge cycle properties of the resulted thin film battery are improved.

In a real-world charging/discharging cycle test, the capacitance of the thin film battery of the invention at its 500 cycle can achieve about 98.7%, which indicates the feasibility of the present invention as the charge-discharge cycle properties of the resulted thin film battery are effectively enhanced. In addition, comparing to the thin film battery that is only manufactured using only RTA process but under the same coating condition, the capacitance density of the thin film battery of the invention is enhanced; and comparing to the thin film battery that is only manufactured using only CTA process, the charge-discharge cycle properties of the resulted thin film battery are improved.

In the present invention, the thin film battery can be achieved by the assembling of single-layered active material coating layers with uniformly distributed fine microcrystal grains, or can be achieved by two-layered structures of an active material coating layers with uniformly distributed fine microcrystal grains and an active material coating layers with uniformly distributed coarse crystal grains. In addition, the protrusion electrodes can be manufactured and provided to form the thin film battery of the invention; or even the collector protrusions can be designed for increasing ion migration paths so as to achieve rapid charging/discharging property while high charge-discharge cycle properties of the thin film battery.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A thin film battery manufacturing method, comprising the steps of:
   depositing an active material on a conductive substrate by sputtering to form a first active material electrode layer, wherein the first active material electrode layer is in a solid form;
   enabling the first active material electrode layer in the solid form to be subjected to an annealing process, while allowing the annealing process to further include the following steps:
   enabling the first active material electrode layer in the solid form to be subjected to a conventional thermal annealing (CTA) process in an oxygen-containing environment at a first temperature interval to form a first active material crystallization precursor; and
   enabling the first active material crystallization precursor to be subjected to a rapid thermal annealing (RTA) process in the oxygen-containing environment at a second temperature interval to form a first active material coating layer with uniformly distributed fine microcrystal grains, in a manner that the temperature range of the second temperature interval is greater than the temperature range of the first temperature interval;
   forming an electrolyte layer on the first active material coating layer; and
   forming an electrode layer on the electrolyte layer while allowing the electrode layer and the first active material coating layer to have opposite polarities.

2. The manufacturing method of claim 1, wherein the first temperature interval is ranged between 300° C. and 500° C.

3. The manufacturing method of claim 1, wherein the second temperature interval is ranged between 500° C. and 900° C.

4. The manufacturing method of claim 1, after the step for forming the first active material coating layer, the method further comprising the following step:
   enabling the first active material coating layer to form at least one first protrusion electrode layer.

5. The manufacturing method of claim 1, before the step for depositing the active material on the conductive substrate, the method further comprises the following steps:

providing a substrate; and enabling a first collector layer to be formed on the substrate so as to form the conductive substrate.

6. The manufacturing method of claim 5, wherein the forming of the first collector layer on the substrate further comprises the following step:

forming at least one first collector protrusion on the first collector layer.

7. The manufacturing method of claim 1, wherein the forming of the electrode layer on the electrolyte layer further comprises the following steps:

forming a second active material coating layer on the electrolyte layer; and forming a second collector layer on the second active material coating layer.

8. The manufacturing method of claim 7, before the step for forming the second collector layer on the second active material coating layer, the method further comprises the following step:

forming at least one second collector protrusion on the second collector layer while enabling each second collector protrusion to embed inside the second active material coating layer.

9. The manufacturing method of claim 1, before the step for forming the first active material coating layer, the method further comprises the following steps:

depositing an active material on the conductive substrate to form a third active material electrode layer; and enabling the third active electrode layer to be subjected to a conventional thermal annealing (CTA) process in the oxygen-containing environment to form a third active material coating layer with uniformly distributed coarse crystal grains, while enabling the third active material coating layer to be disposed between the conductive substrate and the first active material coating layer.

10. The manufacturing method of claim 9, wherein the conventional thermal annealing (CTA) process for forming the third active material coating layer is performed in a temperature interval ranged between 500° C. and 900° C.

11. The manufacturing method of claim 9, after the step for forming the third active material coating layer, the method further comprises the following step:

enabling the third active material coating layer to form at least one third protrusion electrode layer.

12. The manufacturing method of claim 1, wherein the step for forming the electrolyte layer on the first active material coating layer further comprises the following step:

forming at least one electrolyte protrusion on the electrolyte layer.

13. A refined microcrystalline electrode manufacturing method, comprises the following steps:

enabling an active material electrode layer in a solid form and formed by sputtering to be subjected to a conventional thermal annealing (CTA) process in an oxygen-containing environment at a first temperature interval to form an active material crystallization precursor; and enabling the active material crystallization precursor to be subjected to a rapid thermal annealing (RTA) process in the oxygen-containing environment at a second temperature interval to form an active material coating layer with uniformly distributed fine microcrystal grains;

wherein the temperature range of the second temperature interval is greater than the temperature range of the first temperature interval.

14. The manufacturing method of claim 13, wherein the first temperature interval is ranged between 300° C. and 500° C.

15. The manufacturing method of claim 13, wherein the second temperature interval is ranged between 500° C. and 900° C.

* * * * *